(12) United States Patent
Chowdhury

(10) Patent No.: US 11,936,658 B2
(45) Date of Patent: Mar. 19, 2024

(54) INTELLIGENT ASSIGNMENT OF A NETWORK RESOURCE

(71) Applicant: Bank of America Corporation, Charlotte, NC (US)

(72) Inventor: Sanjib Kumar Chowdhury, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 310 days.

(21) Appl. No.: 17/454,930

(22) Filed: Nov. 15, 2021

(65) Prior Publication Data

US 2023/0156012 A1 May 18, 2023

(51) Int. Cl.
*H04L 29/06* (2006.01)
*H04L 9/40* (2022.01)

(52) U.S. Cl.
CPC .................. *H04L 63/104* (2013.01)

(58) Field of Classification Search
CPC ....... H04L 41/14; H04L 41/145; H04L 45/12; H04L 47/70; H04L 47/80; H04L 63/10; H04L 63/104
See application file for complete search history.

(56) References Cited

U.S. PATENT DOCUMENTS

| | | | |
|---|---|---|---|
| 6,636,894 B1 | 10/2003 | Short et al. | |
| 8,301,882 B2 | 10/2012 | Smith | |
| 8,713,641 B1 | 4/2014 | Pagan et al. | |
| 9,426,118 B2 | 8/2016 | Kim | |
| 9,509,692 B2 | 11/2016 | Innes et al. | |
| 9,641,957 B2 | 5/2017 | Raleigh | |
| 9,661,058 B2 | 5/2017 | Kim et al. | |
| 9,756,018 B2 | 9/2017 | Doane et al. | |
| 9,762,458 B2 | 9/2017 | Kim et al. | |
| 9,787,739 B2 | 10/2017 | Sarkic et al. | |
| 9,794,782 B2 | 10/2017 | Pathuri | |
| 9,820,314 B2 | 11/2017 | Sidhu et al. | |
| 9,860,254 B2 | 1/2018 | Smith | |
| 10,122,703 B2 | 11/2018 | Innes et al. | |
| 10,122,757 B1* | 11/2018 | Kruse | H04L 63/10 |
| 10,193,861 B2 | 1/2019 | Smith | |
| 10,231,268 B2 | 3/2019 | Pathuri et al. | |

(Continued)

FOREIGN PATENT DOCUMENTS

| | | |
|---|---|---|
| EP | 1234425 B1 | 8/2006 |
| WO | 2015187463 A1 | 12/2015 |
| WO | 2015187464 A1 | 12/2015 |

*Primary Examiner* — Boris D Grijalva Lobos

(57) ABSTRACT

A system includes a plurality of shared network resources and a central server connected by a network. The central server receives from a first user a request for accessing a network resource. The central server identifies a plurality of user groups the first user is part of and determines a number of other users from the identified user groups who have the closest association with the first user. For each closely associated user of the first user, the central server simulates access to the requested network resource by the respective user based on a user group that provides to the other user access to the network resource. Based on results of the simulating, the central server determines a user group that provides a closest network path to the network resource and generates a recommendation to add the first user to the determined user group.

20 Claims, 4 Drawing Sheets

(56) References Cited

U.S. PATENT DOCUMENTS

| | | |
|---|---|---|
| 10,341,243 B2 | 7/2019 | Short et al. |
| 10,397,778 B2 | 8/2019 | Mistry |
| 10,432,592 B2 | 10/2019 | Singleton, IV et al. |
| 10,444,715 B2 | 10/2019 | Plummer et al. |
| 10,523,658 B2 | 12/2019 | Brouchier et al. |
| 10,524,197 B2 | 12/2019 | Kim et al. |
| 10,554,439 B2 | 2/2020 | Plummer et al. |
| 10,587,596 B1 * | 3/2020 | Sahar .................. H04L 63/08 |
| 10,609,560 B2 | 3/2020 | Mistry et al. |
| 10,630,501 B2 | 4/2020 | Ansari et al. |
| 10,666,634 B2 | 5/2020 | Beckhardt et al. |
| 10,841,316 B2 | 11/2020 | Innes et al. |
| 10,868,715 B2 | 12/2020 | Brandwine et al. |
| 10,951,586 B2 | 3/2021 | Cohn et al. |
| 10,958,640 B2 | 3/2021 | Divoux et al. |
| 11,012,334 B2 | 5/2021 | Kim et al. |
| 11,153,303 B2 | 10/2021 | Scruby |
| 2016/0164748 A1 | 6/2016 | Kim |
| 2017/0093871 A1 * | 3/2017 | Abuelsaad ............ H04L 63/101 |
| 2020/0314088 A1 | 10/2020 | Feijoo et al. |
| 2020/0358651 A1 | 11/2020 | Brandwine et al. |

\* cited by examiner

INTELLIGENT ASSIGNMENT OF A NETWORK RESOURCE

TECHNICAL FIELD

The present disclosure relates generally to data processing, and more specifically to intelligent assignment of a network resource.

BACKGROUND

An organizational computer network generally contains several network resources connected to a network such as the internet. These network resources may include printers, application servers, files etc. which can be shared between users. Access to these network resources may be managed via user groups. A user group typically provides access to one or more network resources of an organization to users assigned to the user group. Often, multiple user groups may provide access to a same network resource. Systems and methods are needed to efficiently identify an appropriate user group to assign a user to provide access to a network resource.

SUMMARY

The system and methods implemented by the system as disclosed in the present disclosure provide an efficient method for intelligently identifying a user group for assigning a user. The disclosed system and methods provide several practical applications and technical advantages.

For example, the disclosed system and methods provide the practical application of intelligently identifying a user group that avoids providing undesired access or unauthorized access to a user requesting access to a network resource. A central server identifies other users who are closely associated with the requesting user. The association between two users is determined based on one or more shared characteristics or properties between the users including, but not limited to, number of shared user groups and sub-groups between the users, a number of already shared network resources, same geographical location (e.g., office location), working on a same project, working on the same floor of a building, working in a same portion of the building, same or similar position or rank and same or similar level of access. The central server selects a user group from one or more user groups that provide access to the requested network resource to other users identified as being closely associated to the requesting user. The central server generates a recommendation to add the requesting user to the selected user group. By recommending a user group that is also assigned to another user who is closely associated with the requesting user, there may be a high likelihood that the recommended user group provides an appropriate level of access to the user by avoiding to provide access to other resources that the requesting user should not access. This is because, closely associated users (e.g., users working in the same geographical location, working on the same project, working in the same building etc.) most likely have similar permissions and authorization levels within the organization. Thus, if another user who is closely associated with the requesting user is already assigned to a user group and has access to a set of resources through the user group, there is a high likelihood that the requesting user is also authorized to access the same set of access resources. Further by avoiding to provide the requesting user access to network resources the user may not be authorized to access, the present system and methods provide a technical advantage of enhanced network security.

The disclosed system and methods provide an additional practical application of identifying a user group to assign the requesting user that provides a shortest network path to the requested network resource. After identifying user groups of closely associated users that provide access to the requested network resource, the central server analyses the identified user groups to determine which one of those user groups provides the shortest network path to the requested network resource. The user group that provides a shortest network path to the requested resource may be the one that has a least number of hops (e.g., user group hops) to the network resource. By identifying a user group that provides the shortest network hop (e.g., user group hop) to the requested network resource, the disclosed system and methods provide an additional technical advantage of reducing temporal delays and/or bandwidth bottlenecks in accessing the network resource.

The disclosed system and methods provide an additional practical application of improving processing performance of one or more computers and performance of an underlying network that connects the one or more computers. For example, assigning a requesting user to an already existing user group may avoid creation of unnecessary new user groups to access the same network resources, thus reducing the overall number of user groups, which may reduce user access-times for those devices and general access times across the network. Improving access times of network devices may result in improved processing of computers and performance of the network. Further, since the overall number of user groups across the network are reduced, the disclosed system and methods provide an additional technical advantage of reducing maintenance time and costs for network.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
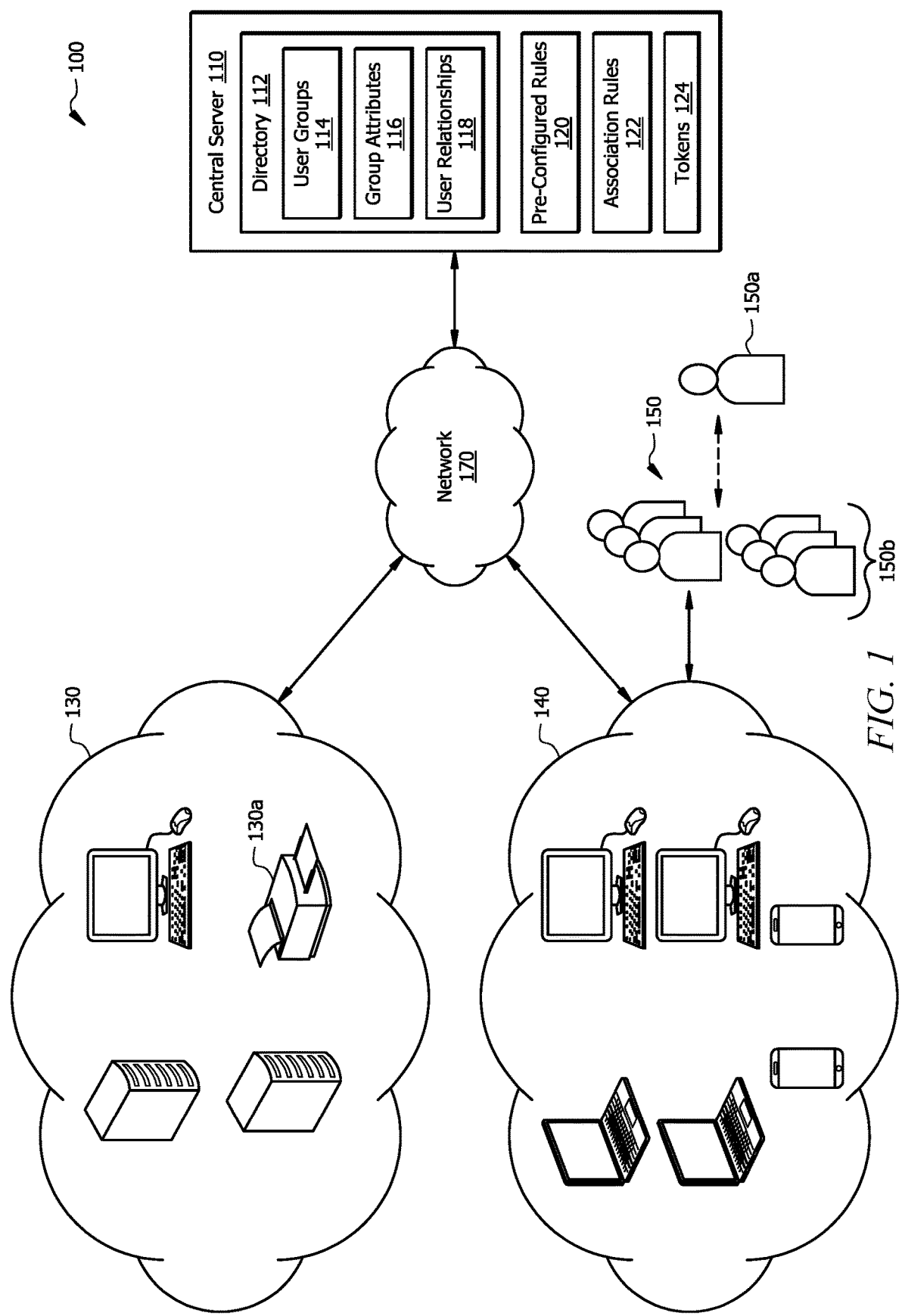
FIG. 1 is a schematic diagram of an example data processing system, in accordance with certain aspects of the present disclosure.

FIG. 1 is a schematic diagram of an example data processing system 100, in accordance with certain aspects of the present disclosure.

As shown in FIG. 1, data processing system 100 may include a central server 110, one or more network resources 130 and one or more user devices 140, each connected to a network 170. The network 170, in general, may be a wide area network (WAN), a personal area network (PAN), a cellular network, or any other technology that allows devices to communicate electronically with other devices. In one or more embodiments, the network 170 may be the Internet. Each user device 140 may be operated by one or more users 150. Each network resource 130 may include a shared hardware or software computer resource. For example, a network resource 130 may be a device or a piece of information on a computer that can be remotely accessed from another computer over the network 170. Some examples of sharable network resources 130 are computer programs, data files, storage devices, servers and printers. Each user device 140 may be a computing device that can be operated by a user 150 and communicate with other devices connected to the network 170.

In one or more embodiments, each of the central server 110, network resources 130 and user devices 140 may be implemented by a computing device running one or more software applications. For example, one or more of the central server 110, network resources 130 and user devices 140 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the central server 110, network resources 130 and user devices 140 may be representative of a server running one or more software applications to implement respective functionality as described below. In certain embodiments, one or more of the central server 110, network resources 130 and user devices 140 may run a thin client software application where the processing is directed by the thin client but largely performed by a central entity such as a server (not shown).

In one or more embodiments, the central server 110 may represent a computing device of a central system including a plurality of computing devices.

Central server 110 may store a directory 112 including information relating to a plurality of user groups 114. Each user group 114 may provide access to one or more network resources 130 to users 150 that are part of the user group 114. A user group 114 may include one or more nested user groups 114 which may be referred to as sub-groups. Each nested user group 114 may further include one or more further nested user groups 114. A sub-group generally provides to its users 150 access to network resources permitted by the sub-group as well as access to network resources 130 permitted by the user group 114 that nests the sub-group. The directory 112 may store a set of group attributes 116 associated with each user group 114. Each group attribute 116 of a user group 114 relates to one or more of a characteristic of the user group 114, a characteristic of a user 150 included in the user group 114 and a relationship between two or more users 150 of the user group 114. For example, group attributes 116 related to a user group 114 may include, but are not limited to, a name of the user group 114, a network address of the user group 114, a list of users 150 assigned to the user group 114, information relating to other user groups 114 (e.g., sub-groups) included in the user group 114, user relationships 118 between users of the user group 114 and permissions assigned to the user group 114 for accessing one or more network resources 130 by users 150 included in the user group 114. User relationships 118 between two users 150 of a user group 114 may include, but are not limited to, one or more of same geographical location, working on the same project, working on the same floor of a building, working in a same portion of the building, same or similar position or rank, same or similar level of access, and a number of user groups shared between the users 150.

Presently, when a user 150a requests access to a network resource 130a, an administrator of the system 100 manually searches for an appropriate user group 114 that provides access to the requested network resource 130a and adds the user 150a to that user group 114 to provide the user 150a access to the requested network resource 130a. Searching for an appropriate user group 114 for the user 150a may be tedious and time consuming. A large organization with a large user base may have hundreds of user groups 114 setup for users 150 of the organization across the globe. There may be several user groups 114 across the organization providing different sets of users 150 access to the same network resource 130. Many of these user groups 114 may provide permissions to access one or more other network resources 130 which the requesting user 150a may not desire access to or should not access. An appropriate user group 114 to assign the requesting user 150a is usually one that provides a lowest level of access to the requesting user 150a. For example, an optimal user group 114 ideally provides access to the requested network resource 130a only and not to any other network resource 130 the user 150a does not desire access to or should not access. Further, one or more user groups 114 that provide access to the requested resource 130a may be nested user groups 114 and may need one or more additional network hops (e.g., user group hops) to access the network resource 130a. Each hop may introduce an additional delay in accessing the network resource 130a. For example, user group A may be nested in user group B which may be further nested in user group C, wherein user group C may provide access to the requested network resource 130a. Thus, a user 150 in user group A may need three hops and a user 150 in user group B may need two hops to access the network resource 130a, while user group C provides direct access to the network resource 130a. An optimal user group 114 provides the user 150a access to the network resource 130a with a least number of hops. For example, an ideal user group 114 provides direct access to the network resource 130a.

Thus, several factors may need to be considered when determining the most appropriate or optimal user group 114 for the user 150a. Accordingly, it may take considerable time and effort to search for and determine the most optimal user group 114 for assigning the user 150a. Owing to the above challenges, the administrator may not always find the most optimal user group 114 to assign the user 150a. For example, a user group 114 assigned to the user 150a may provide access to one or more other network resources 130 the user 150a should not have access to, and/or the user group 114 may be nested within one or more other user groups 114 leading to additional delays in accessing the network resource 130a. These issues may be compounded in the case of large organizations having several hundred user groups 114. For example, with vast user bases, network devices, user groups & subgroups spread across the globe, it is virtually impossible for an administrator to keep track of user groups 114 being created across the organization. This knowledge gap increases the possibility of users 150 getting un-desired access to data or devices. Additionally, the present methods also increase the chances of unnecessary creation of multiple user groups 114 for accessing the same network resources 130 thereby increasing maintenance time & costs for the organization, along with an increase in user access-time for those devices. Additionally, manual grant and revoke of access to users 150 is error prone, time consuming and includes security threats to the organization. Uncontrollable user group creation increases the possibility of identity spoofing and unwanted users getting access to the organization's critical and/or confidential resources.

Embodiments of the present disclosure describe a system (e.g., system 100) and methods implemented by the system for automatically determining an optimal user group 114 to assign a user 150a for providing access to a network resource 130a. The central server 110 may be configured to automatically determine an optimal user group 114 to assign a user 150a requesting access to a network resource 130a. The central server 110 may be configured to identify other users 150b who are closely associated with the requesting user 150a. The association between two users 150 is determined based on one or more shared characteristics between the users 150 including, but not limited to, number of shared user groups 114 and sub-groups between the users, a number of already shared network resources 130, same geographical location (e.g., office location), working on a same project, working on the same floor of a building, working in a same portion of the building, same or similar position or rank and same or similar level of access. In one embodiment, the central server 110 may be configured to determine that two users (e.g., user 150a and another user 150b) are closely associated when the two users share at least a threshold number of characteristics. Higher is the number of shared characteristics, closer is the association between the two users. The central server 110 may analyze user groups 114 that provide access to the requested network resource 130a to the identified other users 150b who are closely associated with user 150a and determine which one of those user groups 114 provides a shortest path to the requested resource 130a. The user group 114 that provides a shortest path to the requested resource 130a may be the one that has a least number of hops (e.g., user group hops) to the network resource 130a. The central server 110 generates a recommendation based on the analysis to add the requesting user 150a to the user group 114 of a closely associated user 150b of the user 150a that provides a shortest network hop to the requested resource 130a. By recommending a user group 114 that is also assigned to another user 150b who is closely associated with the requesting user 150a, there may be a high likelihood that the recommended user group 114 provides an appropriate level of access to the user 150a by avoiding to provide access to other resources 130 that the user 150a should not access. This is because, closely associated users 150 (e.g., users working in the same geographical location, working on the same project, working in the same building etc.) most likely have similar permissions and authorization levels within the organization. Thus, if another user 150b who is closely associated with user 150a is already assigned to a user group 114 and has access to a set of resources 130 through the user group 114, there is a high likelihood that the user 150a is also authorized to access the same set of access resources 130. Further, by identifying a user group 114 that provides the shortest network hop (e.g., user group hop) to the requested network resource 130a via the user groups 114 to which closely associated users 150b of the user 150a are assigned, the central server 110 determines a user group 114 that provides an appropriate level of access as well as the shortest network hop to the user 150a for accessing the network resource 130a. Additionally, assigning a requesting user 150a to an already existing user group 114 may avoid creation of unnecessary new user groups 114 to access the same network resources 130, thus reducing the overall number of user groups 114, which may reduce maintenance time & costs for the organization along with a decrease in user access-times for those devices.

As part of determining other users 150b who are closely associated with the requesting user 150a, the central server 110 is configured to identify all user groups 114 to which the user 150a is already assigned. The central server 110 may be configured to identify closely associated users 150b of user 150a from the pool of other users 150b who share at least one same user group with user 150a. This is a good starting point because if two users are in the same user group 114, there is some likelihood that they may be closely associated. By narrowing down the search for closely associated users 150b of the user 150a to users 150b who share at least one user group 114 with user 150a, this step can potentially eliminate a large number of users 150b from consideration (specially for large organizations with large user bases), thereby increasing the overall efficiency of this method.

The central server 110 may be configured to further narrow down the search for closely associated users 150b of user 150a, by eliminating one or more of the identified user groups 114 of which user 150a is already part of. After this elimination is completed, the central server 110 further processes the remaining user groups 114 in which there is a higher likelihood that user 150a is closely associated with one or more other users 150b. As described above, directory 112 may store a set of group attributes 116 associated with each user group 114. Each group attribute 116 of a user group 114 relates to one or more of a characteristic of the user group 114, a characteristic of a user 150 included in the user group 114 and a relationship between two or more users 150 of the user group 114. For example, group attributes 116 related to a user group 114 may include, but are not limited to, a name of the user group 114, a network address of the user group 114, a list of users 150 assigned to the user group 114, information relating to sub-groups included in the user group 114, user relationship 118 between users of the user group 114 and permissions assigned to the user group 114 for accessing one or more network resources 130 by users 150 included in the user group 114. The central server 110 may be configured to eliminate one or more of the identified user groups 114 based on one or more pre-configured rules 120. Each pre-configured rule 120 may define a criterion for eliminating user groups 114 based on one or more group attributes 116. For each identified user group 114 of the requesting user 150a, the central server 110 may be configured to identify those group attributes 116 of the user group 114 that may not meaningfully associate the user 150a to other users 150b of the user group, based on one or more pre-configured rules 120. A meaningful association between two users 150 may be defined as any shared characteristic between the users that increases the likelihood of the two users being closely associated such that they have same or similar permissions, for example, to access network resources 130. For example, a pre-configured rule 120 may define that a group attribute 116 of a user group 114 specifying that all users 150 of an identified user group 114 belong to the same office location of the organization, may not meaningfully associate the users 150 of the user group 114. The central server 110 may be configured to drop all user groups 114 having this group attribute 116. This rule can be particularly useful for large organizations with large user bases. For example, there may be thousands of users 150 at any office location of the organization and a large user group 114 may exist grouping all users 150 of a particular office location. There is a high likelihood that thousands of users 150 working at the same office location may not all be closely associated with each other to the extent that they have same or similar authorizations to use network resources 130. Thus, considering this large user group 114 to identify closely associated users may be counterproductive and may unnecessarily use considerable resources (e.g., processing resources). In another example, a pre-configured rule 120 may define that a group attribute 116 of a user group 114 specifying that the user group 114 has larger than a threshold number of users 150, may not meaningfully associate the users 150 of the user group 114. All users of a large user group 114 (e.g., having hundreds or thousands of users) may not be closely associated to the extent that they have same or similar authorizations to use network resources. The central server 110 may be configured to drop all user groups 114 having this group attribute 116. In other words, the central server 110 may be configured to drop all user groups 114 with more than a threshold number of users 150.

Once the central server 110 has dropped user groups 114 based on the pre-configured rules 120, the remaining user groups 114 most likely have group attributes 116 that meaningfully associate users of the user groups 114 (e.g., user 150a to other users 150b). Thus, in each of the remaining user groups 114 (after elimination), there is a higher likelihood that user 150a is closely associated with one or more other users 150b of the user group 114.

In one or more embodiments, the pre-configured rules 120 may be defined by an administrator of the system 100, wherein the rules 120 are customized to a nature and structure of an organization. For example, depending on how the users 150 of an organization are grouped, a different criteria may apply as to which group attributes define a meaning association between users 150 of user groups 114.

After identifying all user groups 114 of user 150a and further eliminating one or more of the identified user groups 114 based on pre-configured rules 120, the central server 110 may be configured to determine a resemblance between user 150a and other users 150b of all other remaining user groups 114 (after elimination) based on multi-dimensional hyperplane analysis. As further described below, user 150a and each other user 150b from each remaining user group 114 is plotted on a plurality of hyperplanes, wherein each hyperplane represents and corresponds to a group attribute 116 of one of the remaining user groups 114. A resemblance is determined between user 150a and other users 150b on each hyperplane corresponding to each group attribute 116. Resemblance data from all hyperplanes is cumulated and a cluster of users 150b is determined who have the highest resemblances with user 150a among all users 150 from all remaining groups 114.

Figure 2:
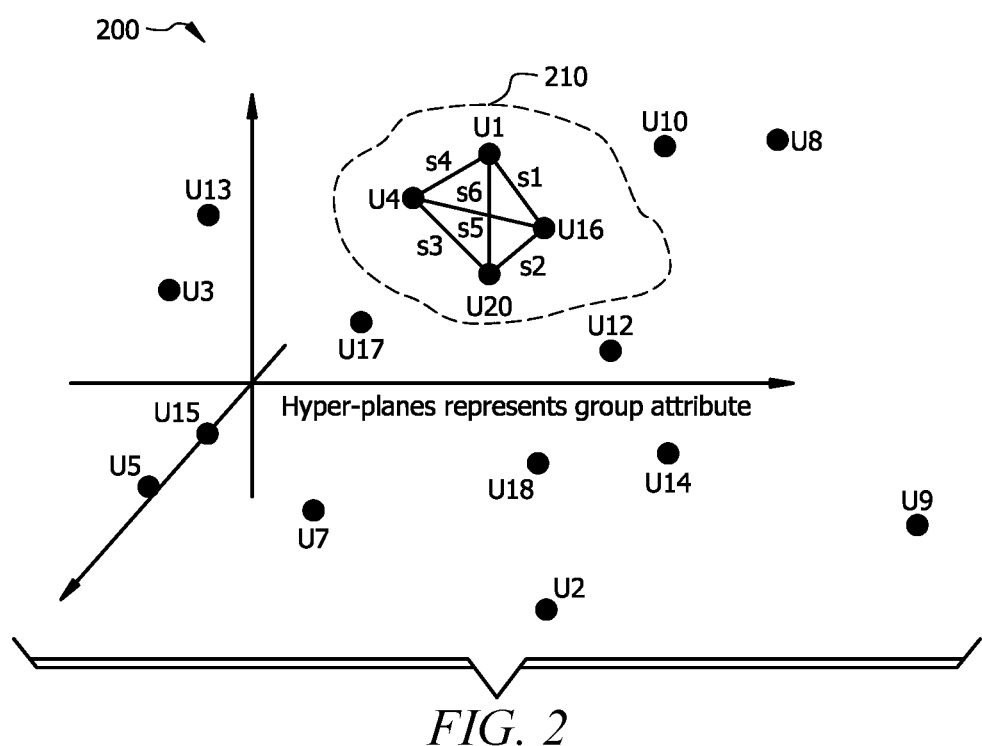
FIG. 2 illustrates an example plot of multi-dimensional hyperplane analysis of users based on a group attribute, in accordance with one or more embodiments of the present disclosure.

FIG. 2 illustrates an example plot 200 of multi-dimensional hyperplane analysis of users 150 based on a group attribute 116, in accordance with one or more embodiments of the present disclosure. As shown in FIG. 2, each user 150 from the user groups 114 is represented by a respective point or dot. U1 represents user 150a and U2-U20 represent other users 150b. In FIG. 2, the hyperplanes represent one group attribute. A distance (e.g., Euclidean distance) between respective points of two users represents the resemblance between the users. For example, s1 represents the resemblance between U1 and U16, s4 represents the resemblance between U1 and U4, and s5 represents the resemblance between U1 and U20. A shorter distance between two points represents a closer resemblance between the respective users. For example, s1 is shorter than s5, which means U16 has a higher resemblance with U1 as compared to U20. S4 is shorter than both s1 and s5, which means U4 has the highest resemblance with U1 among U4, U20 and U16. As can be appreciated from FIGS. 2, U4, U20 and U16 have the closest resemblances with U1 among all other users U2-U20. In one example, plot 200 may map users U1-U20 based on the group attribute specifying how many user groups 114 are shared between the users U1-U20. A shorter distance between two points on plot 200 means more user groups 114 are shared between the respective users. Thus, based on plot 200, a highest number of groups are shared between U1 and each of U4, U16 and U20.

Similar hyperplane plots may be generated by the central server 110 based on other group attributes 116. Results from all hyperplane plots may be combined to determine a cluster (e.g., cluster 210 as shown in FIG. 2) of users 150b who have the highest resemblances with user 150a among all other users 150b. How many number of other users 150b is to be determined for the cluster 210 may be predefined (e.g., by the administrator). The number of users 150b to be included in the cluster 210 may be a pre-defined fixed number or may be determined based on a pre-defined criterion. For example, all users 150b who at least have a threshold resemblance with user 150a based on one or more group attributes may be included in the cluster of users 150b.

Once a cluster 210 of users 150b having the highest resemblances with user 150a among all users 150 from all remaining user groups 114 is determined, the central server 110 may be configured to determine a number of users 150b from the cluster 210 who have the closest association with user 150a among all users 150b of the cluster 210. For example, the cluster 210 may have hundred users 150b determined to have the highest resemblances with user 150a based on multi-dimensional hyperplane analysis. From the cluster 210 of users 150b, the central server 110 may determine the top ten users 150b who have the closest association with user 150a. The central server 110 may be configured to determine an association between user 150a and each user 150b from the cluster 210 based on at least one association rule 122. In one embodiment, an association rule 122 defines an association between user 150a and another user 150b from the cluster 210 based on one or more properties common between user 150a and the other user 150b. For example, a common property may include a number of network resources 130 already being shared (e.g., the users have access to) between user 150a and another user 150b from the cluster 210. An association rule 122 may define that users 150b from the cluster 210 who already share a higher number of network resources 130 with user 150a have a higher association with user 150a. Following the previous example, the central server 110 may determine the number of shared resources 130 between user 150a and each other user 150b from the cluster 210 and select the top ten users 150b from the cluster 210 who share the most number of resources 130 with user 150a. In a modified embodiment, the central server 110 may identify top ten users 150b from the cluster 210 who share the greatest number of resources 130 with user 150b within a geographical location (e.g., office location, building, floor etc.) of user 150b. The number of users 150b to be determined from the cluster 210 having the closest association with user 150a may be pre-defined or determined based on a criterion. For example, all users 150b from the cluster 210 who already share at least a threshold number of resources 130 with user 150a may be identified as closely associated with user 150a.

Once a number of users 150*b* (e.g., top ten users) are selected from the cluster 210, the central server 110 may identify (e.g., from the selected top ten users) those selected users 150*b* who already have access to the requested network resource 130*a* (e.g., the network resource 130*a* user 150*a* desires access to). For example, out of the ten users 150*b* selected from the cluster 210 as having the closest association with user 150*a*, the central server 110 may determine that eight out of those ten users 150*b* already have access to the requested network resource 130*a*. For each user 150*b* who already has access to the resource 130*a*, the central server 110 identifies a corresponding user group 114 that provides the user 150*b* access to the resource 130*a*. For example, the central server 110 may identify eight user groups 114 providing the eight respective users 150*b* access to the resource 130*a*. The central server 110 issues a virtual token 124 to each user 150*b* that has access to resource 130*a*. The central server 110 simulates access to the resource 130*a* by each user 150*b* (e.g., using a user device 140) based on the token 124 assigned to the user 150*b*. Simulating access to the network resource 130*a* by a user 150*b* includes a machine-initiated access to the network that mimics an actual access to the network resource 130 by the user 150*b*. When simulating access to the resource 130*a* by a user 150*b*, the respective token 124 assigned to the user 150*b* may need to traverse one or more sub-groups and follow a particular network path to reach the resource 130. For example, a user 150*b* may be assigned to user group A. However, user group A may be nested in user group B which may be further nested in user group C, wherein user group C may provide access to the requested network resource 130*a*. Thus, access to resource 130*a* by the user 150*b* in user group A may need three hops to access the network resource 130*a*. For each token 124, the central server 110 records an origin user group to which the respective user 150*b* is assigned, a destination user group that provides access to the resource 130*a* (e.g., a larger user group that nests the origin user group), a number of user group hops required to reach the network resource 130*a* and a network path taken to the location of the resource 130*a*. Based on data recorded for each token 124 after simulating access to the network resource 130*a* by each respective user 150*b* closely associated with user 150*a*, the central server 110 determines a user group 114 needing a minimum number of user group hops to access the network resource 130*a* among all simulated user groups 114. For example, an ideal user group 114 may provide direct access to the network resource, meaning the ideal user group 114 is not nested in one or more other user groups 114 that provide access to the resource 130*a*.

The central server 110 may be configured to generate a recommendation to add the user 150*a* to the user group 114 determined to have the least number of user group hops to access the requested network resource 130*a* among the simulated user groups 114. In one embodiment, an administrator may manually determine whether the recommended user group 114 is appropriate to assign the user, and may manually add the user 150*a* to the recommended user group 114 if found appropriate. In an alternative embodiment, the central server 110 may be configured to automatically add the user 150*a* to the recommended user group 114 to provide the user 150*a* access to the requested network resource 130*a*. In one or more embodiments, the central server 110 may determine at least one additional next best user group 114 that provides access to the resource 130*a*. For example, the next best user group 114 may need the next lowest number of user group hops to access the resource 130*a*. The central server 110 may include the next best user group 114 in the recommendation. This allows the administrator to select between multiple recommended user groups 114 to assign the user 150*a*. Additionally, when the primary recommended user group 114 is deleted for some reason, the user 150*a* may be automatically assigned to the next best user group 114.

Figure 3:
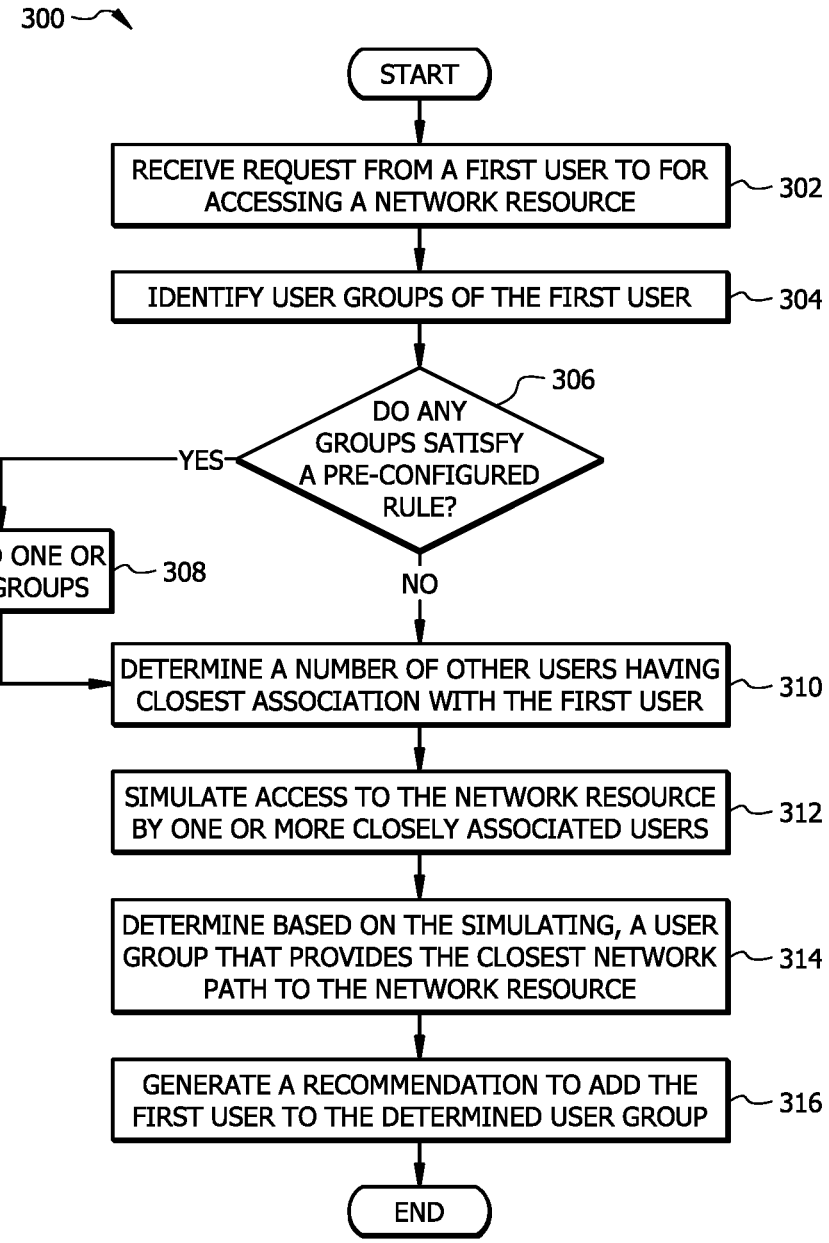
FIG. 3 is a flowchart of an example method for providing a user access to a network resource, in accordance with certain embodiments of the present disclosure.

FIG. 3 is a flowchart of an example method 300 for providing a user (e.g., user 150*a*) access to a network resource (e.g., 130*a*), in accordance with certain embodiments of the present disclosure. Method 300 may be performed by the central server 110 as shown in FIG. 1 and described above.

At operation 302, the central server 110 receives a request from a first user (e.g., user 150*a*) to access a network resource 130*a*. The user 150*a* may place the request using a user device 140 connected to the central server 110 via the network 170.

At operation 304, the central server 110 identifies a plurality of user groups 114 the first user 150*a* is part of, wherein each of the plurality of user groups 114 provides access to a set of network resources 130 to users 150 in the user group 114. As described above, central server 110 may store a directory 112 including information relating to a plurality of user groups 114. Each user group 114 may provide access to one or more network resources 130 to users 150 that are part of the user group 114. A user group 114 may include one or more nested user groups 114 which may be referred to as sub-groups. Each nested user group 114 may further include one or more further nested user groups 114. A sub-group generally provides to its users 150 access to network resources permitted by the sub-group as well as access to network resources 130 permitted by the user group 114 that nests the sub-group. The directory 112 may store a set of group attributes 116 associated with each user group 114. Each group attribute 116 of a user group 114 relates to one or more of a characteristic of the user group 114, a characteristic of a user 150 included in the user group 114 and a relationship between two or more users 150 of the user group 114. For example, group attributes 116 related to a user group 114 may include, but are not limited to, a name of the user group 114, a network address of the user group 114, a list of users 150 assigned to the user group 114, information relating to other user groups 114 (e.g., sub-groups) included in the user group 114, user relationships 118 between users of the user group 114 and permissions assigned to the user group 114 for accessing one or more network resources 130 by users 150 included in the user group 114. In one embodiment, the central server 110 may identify all user groups 114 to which the user 150*a* is already assigned based on information stored in the directory 112.

At operation 306, the central server 110 checks whether one or more of the identified user groups 114 of the user 150*a* satisfy a pre-configured rule 120. When one or more of the identified user groups 114 are determined to satisfy at least one pre-configured rule 120, method 300 proceeds to operation 308 where the central server 110 discards one or more user groups based on the pre-configured rules. Otherwise, method 300 proceeds to operation 310.

As described above, the central server 110 may narrow down the search for closely associated users 150*b* of user 150*a*, by eliminating one or more of the identified user groups 114 of which user 150*a* is already part of. After this elimination is completed, the central server 110 further processes the remaining user groups 114 in which there is a higher likelihood that user 150*a* is closely associated with one or more other users 150*b*. As described above, directory 112 may store a set of group attributes 116 associated with each user group 114. Each group attribute 116 of a user group 114 relates to one or more of a characteristic of the user group 114, a characteristic of a user 150 included in the user group 114 and a relationship between two or more users 150 of the user group 114. For example, group attributes 116 related to a user group 114 may include, but are not limited to, a name of the user group 114, a network address of the user group 114, a list of users 150 assigned to the user group 114, information relating to sub-groups included in the user group 114, user relationship 118 between users of the user group 114 and permissions assigned to the user group 114 for accessing one or more network resources 130 by users 150 included in the user group 114. The central server 110 may eliminate one or more of the identified user groups 114 based on one or more pre-configured rules 120. Each pre-configured rule 120 may define a criterion for eliminating user groups 114 based on one or more group attributes 116. For each identified user group 114 of the requesting user 150a, the central server 110 may identify those group attributes 116 of the user group 114 that may not meaningfully associate the user 150a to other users 150b of the user group, based on one or more pre-configured rules 120. A meaningful association between two users 150 may be defined as any shared characteristic between the users that increases the likelihood of the two users being closely associated such that they have same or similar permissions, for example, to access network resources 130. For example, a pre-configured rule 120 may define that a group attribute 116 of a user group 114 specifying that all users 150 of an identified user group 114 belong to the same office location of the organization, may not meaningfully associate the users 150 of the user group 114. The central server 110 may drop all user groups 114 having this group attribute 116. This rule can be particularly useful for large organizations with large user bases. For example, there may be thousands of users 150 at any office location of the organization and a large user group 114 may exist grouping all users 150 of a particular office location. There is a high likelihood that thousands of users 150 working at the same office location may not all be closely associated with each other to the extent that they have same or similar authorizations to use network resources 130. Thus, considering this large user group 114 to identify closely associated users may be counterproductive and may unnecessarily use considerable resources (e.g., processing resources). In another example, a pre-configured rule 120 may define that a group attribute 116 of a user group 114 specifying that the user group 114 has larger than a threshold number of users 150, may not meaningfully associate the users 150 of the user group 114. All users of a large user group 114 (e.g., having hundreds or thousands of users) may not be closely associated to the extent that they have same or similar authorizations to use network resources. The central server 110 may drop all user groups 114 having this group attribute 116. In other words, the central server 110 may drop all user groups 114 with more than a threshold number of users 150.

Once the central server 110 has dropped user groups 114 based on the pre-configured rules 120, the remaining user groups 114 most likely have group attributes 116 that meaningfully associate users of the user groups 114 (e.g., user 150a to other users 150b). Thus, in each of the remaining user groups 114 (after elimination), there is a higher likelihood that user 150a is closely associated with one or more other users 150b of the user group 114.

In one or more embodiments, the pre-configured rules 120 may be defined by an administrator of the system 100, wherein the rules 120 are customized to a nature and structure of an organization. For example, depending on how the users 150 of an organization are grouped, a different criterion may apply as to which group attributes define a meaning association between users 150 of user groups 114.

At operation 310, the central server 110 determines a number of other users 150b who have a closest association with the first user 150a, based on association data relating to an association between the first user 150a and other users 150b from the identified user groups 114 of the user 150a. In one embodiment, the determined number of other users 150b have a highest number of common properties with the user 150a. The association data may correspond to the data stored in the directory 112. For example, association data may include the group attributes 116 and user relationships 118.

After identifying all user groups 114 of user 150a and further eliminating one or more of the identified user groups 114 based on pre-configured rules 120, the central server 110 may determine a resemblance between user 150a and other users 150b of all other remaining user groups 114 (after elimination) based on multi-dimensional hyperplane analysis. As described above with reference to FIG. 2, user 150a and each other user 150b from each remaining user group 114 is plotted on a plurality of hyperplanes, wherein each hyperplane represents and corresponds to a group attribute 116 of one of the remaining user groups 114. A resemblance is determined between user 150a and other users 150b on each hyperplane corresponding to each group attribute 116. Resemblance data from all hyperplanes is cumulated and a cluster of users 150b is determined who have the highest resemblances with user 150a among all users 150 from all remaining groups 114. As shown in FIG. 2, each user 150 from the user groups 114 is represented by a respective point or dot, where the hyperplanes represent one group attribute. A distance (e.g., Euclidean distance) between respective points of two users represents the resemblance between the users. A shorter distance between two points represents a closer resemblance between the respective users. Hyperplane plots (e.g., as shown in FIG. 2) may be generated by the central server 110 based on all group attributes 116. Results from all hyperplane plots may be combined to determine a cluster (e.g., cluster 210 as shown in FIG. 2) of users 150b who have the highest resemblances with user 150a among all other users 150b. How many number of other users 150b is to be determined for the cluster 210 may be predefined (e.g., by the administrator). The number of users 150b to be included in the cluster 210 may be a pre-defined fixed number or may be determined based on a pre-defined criterion. For example, all users 150b who at least have a threshold resemblance with user 150a based on one or more group attributes may be included in the cluster of users 150b.

Once a cluster 210 of users 150b having the highest resemblances with user 150a among all users 150 from all remaining user groups 114 is determined, the central server 110 may be configured to determine a number of users 150b from the cluster 210 who have the closest association with user 150a among all users 150b of the cluster 210. For example, the cluster 210 may have hundred users 150b determined to have the highest resemblances with user 150a based on multi-dimensional hyperplane analysis. From the cluster 210 of users 150b, the central server 110 may determine the top ten users 150b who have the closest association with user 150a. The central server 110 may be configured to determine an association between user 150a and each user 150b from the cluster 210 based on at least one association rule 122. In one embodiment, an association rule 122 defines an association between user 150a and another user 150*b* from the cluster 210 based on one or more properties common between user 150*a* and the other user 150*b*. For example, a common property may include a number of network resources 130 already being shared (e.g., the users have access to) between user 150*a* and another user 150*b* from the cluster 210. An association rule 122 may define that users 150*b* from the cluster 210 who already share a higher number of network resources 130 with user 150*a* have a higher association with user 150*a*. Following the previous example, the central server 110 may determine the number of shared resources 130 between user 150*a* and each other user 150*b* from the cluster 210 and select the top ten users 150*b* from the cluster 210 who share the most number of resources 130 with user 150*a*. In a modified embodiment, the central server 110 may identify top ten users 150*b* from the cluster 210 who share the greatest number of resources 130 with user 150*b* within a geographical location (e.g., office location, building, floor etc.) of user 150*b*. The number of users 150*b* to be determined from the cluster 210 having the closest association with user 150*a* may be pre-defined or determined based on a criterion. For example, all users 150*b* from the cluster 210 who already share at least a threshold number of resources 130 with user 150*a* may be identified as closely associated with user 150*a*.

At operation 312, the central server 110 simulates access to the requested network resource 130*a* by each closely associated user 150*b* of user 150*a* who already has access to the network resource 130*a*. As described above, once a number of users 150*b* (e.g., top ten users) are selected from the cluster 210, the central server 110 may identify (e.g., from the selected top ten users) those selected users 150*b* who already have access to the requested network resource 130*a* (e.g., the network resource 130*a* user 150*a* desires access to). For example, out of the ten users 150*b* selected from the cluster 210 as having the closest association with user 150*a*, the central server 110 may determine that eight out of those ten users 150*b* already have access to the requested network resource 130*a*. For each user 150*b* who already has access to the resource 130*a*, the central server 110 identifies a corresponding user group 114 that provides the user 150*b* access to the resource 130*a*. For example, the central server 110 may identify eight user groups 114 providing the eight respective users 150*b* access to the resource 130*a*. The central server 110 issues a virtual token 124 to each user 150*b* that has access to resource 130*a*. The central server 110 simulates access to the resource 130*a* by each user 150*b* (e.g., using a user device 140) based on the token 124 assigned to the user 150*b*. Simulating access to the network resource 130*a* by a user 150*b* includes a machine-initiated access to the network that mimics an actual access to the network resource 130 by the user 150*b*.

At operation 314, the central server 110 may determine based on simulating access to the network resource 130*a*, a user group 114 that provides a closest network path to the network resource among all identified user groups 114. As described above, when simulating access to the resource 130*a* by a user 150*b*, the respective token 124 assigned to the user 150*b* may need to traverse one or more sub-groups and follow a particular network path to reach the resource 130. For example, a user 150*b* may be assigned to user group A. However, user group A may be nested in user group B which may be further nested in user group C, wherein user group C may provide access to the requested network resource 130*a*. Thus, access to resource 130*a* by the user 150*b* in user group A may need three hops to access the network resource 130*a*. For each token 124, the central server 110 records an origin user group to which the respective user 150*b* is assigned, a destination user group that provides access to the resource 130*a* (e.g., a larger user group that nests the origin user group), a number of user group hops required to reach the network resource 130*a* and a network path taken to the location of the resource 130*a*. Based on data recorded for each token 124 after simulating access to the network resource 130*a* by each respective user 150*b* closely associated with user 150*a*, the central server 110 determines a user group 114 needing a minimum number of user group hops to access the network resource 130*a* among all simulated user groups 114. For example, an ideal user group 114 may provide direct access to the network resource, meaning the ideal user group 114 is not nested in one or more other user groups 114 that provide access to the resource 130*a*.

At operation 316, the central server 110 generates a recommendation to add the user 150*a* to the user group 114 determined to have the least number of network hops (e.g., user group hops) to access the requested network resource 130*a* among the simulated user groups 114. In one embodiment, an administrator may manually determine whether the recommended user group 114 is appropriate to assign the user, and may manually add the user 150*a* to the recommended user group 114 if found appropriate. In an alternative embodiment, the central server 110 may automatically add the user 150*a* to the recommended user group 114 to provide the user 150*a* access to the requested network resource 130*a*. In one or more embodiments, the central server 110 may determine at least one additional next best user group 114 that provides access to the resource 130*a*. For example, the next best user group 114 may need the next lowest number of user group hops to access the resource 130*a*. The central server 110 may include the next best user group 114 in the recommendation. This allows the administrator to select between multiple recommended user groups 114 to assign the user 150*a*. Additionally, when the primary recommended user group 114 is deleted for some reason, the user 150*a* may be automatically assigned to the next best user group 114.

In one or more embodiments, the central server 110 may detect that a user group providing the first user access to the network resource has been deleted. In response the central server 110 may determine based on results of the simulating access to the network resource, a second user group that provides a next minimum number of network hops to the network resource. The central server may generate a second recommendation to add the first user to the determined second user group to provide the first user access to the network resource.

Figure 4:
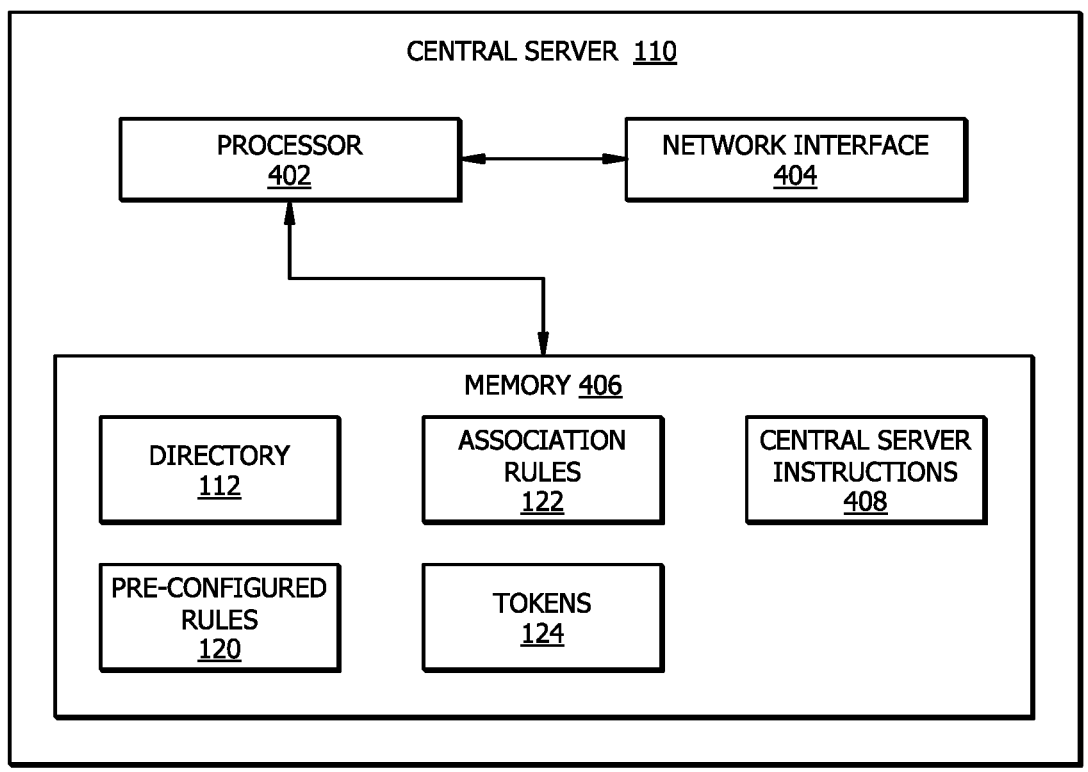
FIG. 4 illustrates an example schematic diagram of the central server illustrated in FIG. 1, in accordance with one or more embodiments of the present disclosure.

FIG. 4 illustrates an example schematic diagram 400 of the central server 110 illustrated in FIG. 1, in accordance with one or more embodiments of the present disclosure.

Central server 110 includes a processor 402, a memory 406, and a network interface 404. The central server 110 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., central server instructions 408) to implement the central server 110. In this way, processor 402 may be a special-purpose computer designed to implement the functions disclosed herein. In one or more embodiments, the central server 110 is implemented using logic units, FPGAs, ASICs, DSPs, or any other suitable hardware. The central server 110 is configured to operate as described with reference to FIGS. 1-3. For example, the processor 402 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store directory 112, pre-configured rules 120, association rules 122, tokens 124 and the central server instructions 408. The central server instructions 408 may include any suitable set of instructions, logic, rules, or code operable to execute the central server 110.

The network interface 404 is configured to enable wired and/or wireless communications. The network interface 404 is configured to communicate data between the central server 110 and other devices, systems, or domains (e.g. network resources 130 and user devices 140). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that each network resource 130 and user device 140 may be implemented similar to the central server 110. For example, each network resource 130 and each user device 140 may include a processor and a memory storing instructions to implement the respective functionality when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a plurality of shared network resources accessible by a plurality of users; and
a central processor configured to:
receive from a first user of the plurality of users a request for accessing a network resource of the plurality of shared network resources;
identify a plurality of user groups the first user is part of, wherein each of the plurality of user groups provides access to a set of network resources to users in the user group;
obtain association data relating to an association of the first user with a plurality of other users from the plurality of identified user groups, wherein the association data includes one or more common properties between the first user and one or more of the other users;
determine from the plurality of other users based on the association data, a number of the other users having closest association with the first user, wherein among all other users, the determined number of other users have a highest number of common properties with the first user;
identify a set of the other users from the number of other users that are authorized to access the requested network resource;
for each other user of the set of other users, identify a corresponding user group that provides access to the requested network resource to the other user;
for each other user of the set of other users, simulate access to the network resource by the user via the corresponding identified user group, wherein simulating access to the network resource by a user comprises a machine-initiated access to the network resource that mimics an actual access to the network resource initiated by the user;
determine based on the simulating access to the network resource, a user group that provides a closest network path to the network resource among all identified user groups, wherein the closest network path comprises a lowest number of network hops for accessing the network resource; and
generate a recommendation to add the first user to the determined user group to provide the first user access to the network resource.

2. The system of claim 1, wherein the at least one processor is further configured to add the first user to the determined user group to provide the first user access to the network resource.

3. The system of claim 1, wherein the at least one processor is further configured to:
identify from the association data a plurality of attributes related to each user group of the first user, wherein each attribute of a user group relates to one or more of a characteristic of the user group, a characteristic of a user included in the user group and a relationship between two or more users of the user group; and
eliminate one or more user groups of the plurality of identified user groups based on at least one pre-configured rule, wherein the at least one pre-configured rule defines a criterion for eliminating one or more user groups based on one or more attributes.

4. The system of claim 3, wherein the at least one processor is further configured to:
map on a plurality of hyperplanes the first user and the plurality of other users from one or more remaining user groups after eliminating the one or more user groups, wherein:
each hyperplane corresponds to a different attribute of the plurality of attributes;
the first user and each of the other users is represented by a unique point on each hyperplane; and
a distance between two points on each hyperplane represents a resemblance of the respective users corresponding to the points;
determine a resemblance between the first user and each of the plurality of other users based on distances between respective points of the first user and the other user on each hyperplane; and
determine a cluster of the other users with highest resemblances with the first user, wherein the other users with the highest resemblances have the shortest cumulative distances across all hyperplanes between each respective point representing each other user and the point representing the first user.

5. The system of claim 4, wherein the at least one processor is further configured to:
determine an association between the first user and each other user from the cluster based on at least one association rule, wherein the at least one association rule defines an association between the first user and another user from the cluster based on one or more properties common between the first user and the other user; and
select the number of other users from the cluster that have the closest determined association with the first user.

6. The system of claim 5, wherein the one or more common properties comprises one or more common network resources the first user and the other user from the cluster are authorized to access.

7. The system of claim 5, wherein the at least one processor is configured to determine the user group that provides the closest network path to the network resource by:
assigning a token to each other user from the number of other users;
for each other user:
simulating access to the requested network resource via the corresponding user group of the other user based on the token assigned to the other user;
incrementing a counter corresponding to the token for every network hop when attempting to access the network resource, wherein a network hop comprises a hop between user groups when a user group is nested in another user group; and
determining a total number of network hops needed to access the network resource based on the value of the counter after successfully accessing the network resource; and
selecting a user group having the minimum number of network hops to access the network resource as the user group that provides the closest network path to the network resource.

8. The system of claim 1, wherein the processor is further configured to:
detect that the determined user group providing the first user access to the network resource has been deleted;
determine based on results of the simulating access to the network resource, a second user group that provides a next minimum number of network hops to the network resource; and
generate a second recommendation to add the first user to the determined second user group to provide the first user access to the network resource.

9. The system of claim 1, wherein the requested network resource comprises a hardware resource or a software resource accessible to at least the first user via a network.

10. A method for selecting a user group, comprising:
receiving from a first user a request for accessing a network resource;
identifying a plurality of user groups the first user is part of, wherein each of the plurality of user groups provides access to a set of network resources to users in the user group;
obtaining association data relating to an association of the first user with a plurality of other users from the plurality of identified user groups, wherein the association data includes one or more common properties between the first user and one or more of the other users;
determining from the plurality of other users based on the association data, a number of the other users having closest association with the first user, wherein among all other users, the determined number of other users have a highest number of common properties with the first user;
identifying a set of the other users from the number of other users that are authorized to access the requested network resource;
for each other user of the set of other users, identifying a corresponding user group that provides access to the requested network resource to the other user;
for each other user of the set of other users, simulating access to the network resource by the user via the corresponding identified user group, wherein simulating access to the network resource by a user comprises a machine-initiated access to the network resource that mimics an actual access to the network resource initiated by the user;
determining based on the simulating access to the network resource, a user group that provides a closest network path to the network resource among all identified user groups, wherein the closest network path comprises a lowest number of network hops for accessing the network resource; and
generating a recommendation to add the first user to the determined user group to provide the first user access to the network resource.

11. The method of claim 10, further comprising adding the first user to the determined user group to provide the first user access to the network resource.

12. The method of claim 10, further comprising:
identifying from the association data a plurality of attributes related to each user group of the first user, wherein each attribute of a user group relates to one or more of a characteristic of the user group, a characteristic of a user included in the user group and a relationship between two or more users of the user group; and
eliminating one or more user groups of the plurality of identified user groups based on at least one pre-configured rule, wherein the at least one pre-configured rule defines a criterion for eliminating one or more user groups based on one or more attributes.

13. The method of claim 12, further comprising:
mapping on a plurality of hyperplanes the first user and the plurality of other users from one or more remaining user groups after eliminating the one or more user groups, wherein:
each hyperplane corresponds to a different attribute of the plurality of attributes;
the first user and each of the other users is represented by a unique point on each hyperplane; and
a distance between two points on each hyperplane represents a resemblance of the respective users corresponding to the points;
determining a resemblance between the first user and each of the plurality of other users based on distances between respective points of the first user and the other user on each hyperplane; and
determining a cluster of the other users with highest resemblances with the first user, wherein the other users with the highest resemblances have the shortest cumulative distances across all hyperplanes between each respective point representing each other user and the point representing the first user.

14. The method of claim 13, further comprising:
determining an association between the first user and each other user from the cluster based on at least one association rule, wherein the at least one association rule defines an association between the first user and another user from the cluster based on one or more properties common between the first user and the other user; and
selecting the number of other users from the cluster that have the closest determined association with the first user.

15. The method of claim 14, wherein the one or more common properties comprises one or more common network resources the first user and the other user from the cluster are authorized to access.

16. The method of claim 14, wherein determining the user group that provides the closest network path to the network resource comprises:
assigning a token to each other user from the number of other users;
for each other user:
simulating access to the requested network resource via the corresponding user group of the other user based on the token assigned to the other user;
incrementing a counter corresponding to the token for every network hop when attempting to access the network resource, wherein a network hop comprises a hop between user groups when a user group is nested in another user group; and
determining a total number of network hops needed to access the network resource based on the value of the counter after successfully accessing the network resource; and
selecting a user group having the minimum number of network hops to access the network resource as the user group that provides the closest network path to the network resource.

17. A non-transitory computer-readable medium storing instructions that when executed by a processor causes the processor to:
receive from a first user a request for accessing a network resource;
identify a plurality of user groups the first user is part of, wherein each of the plurality of user groups provides access to a set of network resources to users in the user group;
obtain association data relating to an association of the first user with a plurality of other users from the plurality of identified user groups, wherein the association data includes one or more common properties between the first user and one or more of the other users;
determine from the plurality of other users based on the association data, a number of the other users having closest association with the first user, wherein among all other users, the determined number of other users have a highest number of common properties with the first user;
identify a set of the other users from the number of other users that are authorized to access the requested network resource;
for each other user of the set of other users, identify a corresponding user group that provides access to the requested network resource to the other user;
for each other user of the set of other users, simulate access to the network resource by the user via the corresponding identified user group, wherein simulating access to the network resource by a user comprises a machine-initiated access to the network resource that mimics an actual access to the network resource initiated by the user;
determine based on the simulating access to the network resource, a user group that provides a closest network path to the network resource among all identified user groups, wherein the closest network path comprises a lowest number of network hops for accessing the network resource; and
generate a recommendation to add the first user to the determined user group to provide the first user access to the network resource.

18. The non-transitory computer-readable medium of claim 17, wherein the instructions further cause the processor to:
identify from the association data a plurality of attributes related to each user group of the first user, wherein each attribute of a user group relates to one or more of a characteristic of the user group, a characteristic of a user included in the user group and a relationship between two or more users of the user group; and
eliminate one or more user groups of the plurality of identified user groups based on at least one pre-configured rule, wherein the at least one pre-configured rule defines a criterion for eliminating one or more user groups based on one or more attributes.

19. The non-transitory computer-readable medium of claim 18, further comprising instruction for:

map on a plurality of hyperplanes the first user and the plurality of other users from one or more remaining user groups after eliminating the one or more user groups, wherein:
    each hyperplane corresponds to a different attribute of the plurality of attributes;
    the first user and each of the other users is represented by a unique point on each hyperplane; and
    a distance between two points on each hyperplane represents a resemblance of the respective users corresponding to the points;
determine a resemblance between the first user and each of the plurality of other users based on distances between respective points of the first user and the other user on each hyperplane; and
determine a cluster of the other users with highest resemblances with the first user, wherein the other users with the highest resemblances have the shortest cumulative distances across all hyperplanes between each respective point representing each other user and the point representing the first user.

20. The non-transitory computer-readable medium of claim 19, further comprising instruction for:
determine an association between the first user and each other user from the cluster based on at least one association rule, wherein the at least one association rule defines an association between the first user and another user from the cluster based on one or more properties common between the first user and the other user; and
select the number of other users from the cluster that have the closest determined association with the first user.

\* \* \* \* \*